Patented Dec. 14, 1948

2,456,090

UNITED STATES PATENT OFFICE 2,456,090

PREPARATION OF NOVEL DICYANDIAMIDE DERIVATIVES

John Kenson Simons, Toledo, Ohio, assignor, by mesne assignments, to Libbey-Owens-Ford Glass Company, a corporation of Ohio No Drawing. Application March 27, 1942,
Serial No. 436,485

3 Claims. (Cl. 260—308)

The invention relates to the preparation of useful derivatives of dicyandiamide

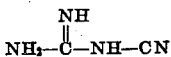

which are new carbon compounds.

Guanazole, which has the following structural formula:

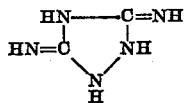

or

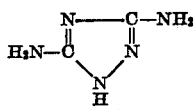

can be prepared by reacting dicyandiamide with hydrazine hydrate. However, the yield of guanazole is low and uncertain, and the formation of guanazole takes place very slowly, with the simultaneous production of soluble colored products which are difficult to separate from the guanazole. For these reasons, it is not feasible at present to prepare guanazole in sufficiently pure form for use in the commercial production of a synthetic resin by reaction with formaldehyde.

Phenyl guanazole, having the structural formula:

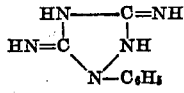

or

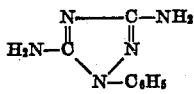

also reacts with formaldehyde to form a resin, but the resin is unsatisfactory in that it is rapidly discolored by exposure to daylight or to a moderately elevated temperature.

The principal object of the invention is the preparation of novel dicyandiamide derivatives which can be obtained readily in pure form and in good yields, and which react with formaldehyde to form synthetic resins that are not discolored by exposure to daylight or to moderately elevated temperatures. More specific objects and advantages are apparent from the description, which discloses and illustrates the invention and is not intended to impose limitations upon the claims.

The novel carbon compounds of the present invention are prepared by reacting dicyandiamide with a hydrazide of an organic acid. The present method of preparing dicyandiamide derivatives is versatile in that a large variety of hydrazides may be used for the reaction with dicyandiamide, to give various dicyandiamide derivatives, which, by reaction with formaldehyde, produce resins that have widely varied properties and are therefore suitable for various uses. The reaction of formaldehyde with such derivatives and compositions comprising products of such a reaction are claimed in application Ser. No. 436,839, filed March 30, 1942.

The reaction between the dicyandiamide and the hydrazide is preferably carried out in aqueous solution. Ammonia is liberated in the reaction, and it is therefore preferable to carry out the reaction under acid conditions in order that the liberated ammonia may be converted into an ammonium salt. The degree of acidity used is simply that acidity which is sufficient to cause the conversion of the desired amount of ammonia to the ammonium salt. Of course the acidity should not be so great as to cause excessive hydrolysis of the reaction product.

The proportion of dicyandiamide to hydrazide used for the reaction may be varied within wide limits, but it is believed that the proportion that actually takes part in the reaction is 1 mol of dicyandiamide for each mol of the hydrazide.

The reaction proceeds at ordinary temperatures, but can be carried out more expeditiously at about 100° C. The hydrazides which may be used for the reaction with dicyandiamide consist of substances having the general formula A—NH—NH$_2$, in which A is selected from the group consisting of

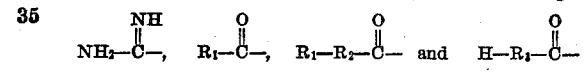

R$_1$ is selected from the group consisting of

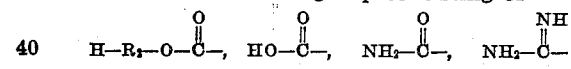

and

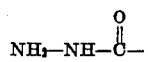

R$_2$ is selected from the group consisting of alkylene, arylene, polymethylene, alkylene aryl and arylene alkyl, and R$_3$ is selected from the group consisting of —NH—, —NH—NH— and R$_2$. Examples of hydrazides that may be used are the hydrazide of an alkyl carboxylic, aryl carboxylic, arylalkyl carboxylic or alkylaryl carboxylic acid. The mono- or dihydrazide of a dicarboxylic acid or the monohydrazide of the monoamidine, monoamide, or monoester of a dicarboxylic acid may also be used.

Because of their relative insolubility and high melting points, the novel carbon compounds prepared in accordance with the invention are believed to be cyclic compounds. They may have the general structural formula:

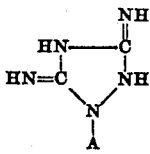

or

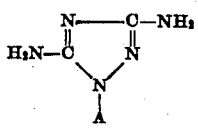

in which A is

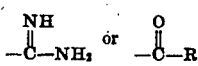

R having the same significance as $R_1$, $R_1$—$R_2$— or $HR_3$ in the general formula mentioned above.

Thus if the hydrazide reacted with dicyandiamide is semicarbazide, i. e., if, in the general formula for the hydrazide in the next to the last paragraph,

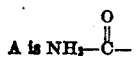

the resulting carbon compound would be 1-carbamyl guanazole, having the structural formula:

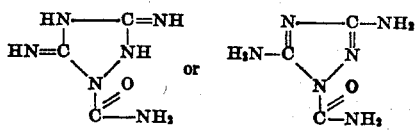

If the hydrazide reacted with dicyandiamide is aminoguanidine, i. e., if in the general formula for the hydrazide A is

the resulting carbon compound would be 1-guanyl guanazole, having the structural formula:

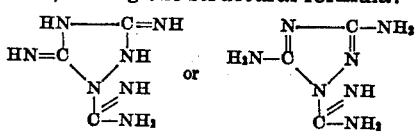

Example 1

448 grams (4 mols) of semicarbazide hydrochloride

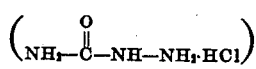

and 336 grams (4 mols) of dicyandiamide are added to 1 liter of water, and the mixture is heated. As the boiling point is approached, an exothermic reaction begins which keeps the liquid boiling for about 5 minutes. At the end of the 5 minutes, a precipitate begins to form, and the solution is refluxed for an additional period of 15 minutes. The mixture is then cooled, and the solid (280 grams) is filtered off. The solid, which is only slightly soluble in water, decomposes at 230–235° C. The product can be purified by extracting with 500 cc. of water at room temperature to give 175 grams of the purified product, which decomposes at 240–245° C. If 4 mols of sodium acetate are incorporated in the reaction mixture of this example, the reaction is not noticeably exothermic, precipitation does not begin until after 40 minutes of refluxing, and the yield is smaller.

Example 2

The reaction is carried out as in Example 1, except that the proportion of semicarbazide hydrochloride used is reduced by one half. The reaction is slower than in Example 1, and at least 30 per cent of the dicyandiamide can be recovered unreacted. About 20 grams of a purified reaction product similar to the product of Example 1 is obtained for each mol of semicarbazide hydrochloride used.

Example 3

The mother liquor from which the 280 grams of reaction product was separated in Example 1 is refluxed for 6 hours. During that period, a solid separates from the solution. The solution is cooled, and the solid precipitate is then separated and washed with water to give a yield of 100 grams. This product shows no decomposition when heated up to 260° C., and is substantially insoluble in water. Its structural formula may be an exception to the general formula on page 3, as follows:

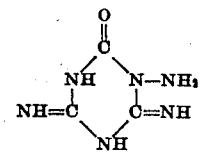

Example 4

224 grams (2 mols) of semicarbozide hydrochloride, 168 grams (2 mols) of dicyandiamide and 500 cc. of water are refluxed for 2 hours, and the solid (143 grams) is then filtered out of the hot solution. Washing with water at room temperature gives a yield of 110 grams of a product similar to the product of Example 3. An additional 50 grams of this product can be obtained from the mother liquor by continued refluxing. If the proportion of semicarbazide hydrochloride is doubled in the foregoing procedure, the formation of the insoluble reaction product is accelerated, but the excess of semicarbazide hydrochloride remains unreacted.

Example 5

53.8 grams (.64 mol) of dicyandiamide, 88.7 grams (.64 mol) of aminoguanidine nitrate

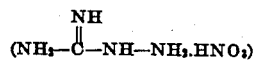

and 180 cc. of water are refluxed for 2½ hours. The mixture is then chilled, and the solid is filtered off. Recrystallization from alcohol gives 68 grams of a product having a melting point of 123–125° C.

Example 6

Benzohydrazide

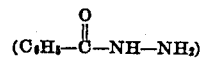

may be prepared as follows: 1 mol (59 grams) of an 85 per cent aqueous solution of hydrazine hydrate is placed in a flask and refluxed on a hot water bath. A small amount of methyl benzoate is added, and after the solution has become homogeneous, an additional small amount of methyl benzoate is added. This process is repeated until 135 grams of methyl benzoate have been used. After 2 hours' heating on the water bath, the solution is chilled. The mass of crystals that separates is filtered off, washed with ether and dried. If the filtrate is partially evaporated, a second crop of crystals can be obtained in the same manner to give a total yield of 120 grams of benzohydrazide melting at 110–112° C. 13.6 grams of benzohydrazide (0.1 mol), 8.4 grams of dicyandiamide (0.1 mol), 30 cc. of water and 8.7 cc. of concentrated hydrochloric acid are refluxed for a short time. By cooling the resulting solution, a solid reaction product can be obtained which, after two recrystallizations from an alcohol-water solution, melts at 215–218° C.

*Example 7*

A quantitative yield of benzohydrazide hydrochloride, melting at 185° C. can be obtained by adding an excess of ethereal hydrogenchloride to an alcohol-ether solution of benzohydrazide.

17.2 grams (0.1 mol) of benzohydrazide hydrochloride, 8.4 grams (0.1 mol) of dicyandiamide and 30 cc. of water are refluxed for 1½ hours. The mixture is then cooled, and the solid reaction product is filtered off. After two recrystallizations from alcohol, a yield of 4 grams of the reaction product, melting at 223–225° C., is obtained. A further crop of 1 gram of the reaction product can be obtained after further refluxing of the filtrate. The product obtained by this procedure, although slightly more pure, is the same as the reaction product obtained in accordance with Example 6.

*Example 8*

The hydrazide of propionic acid can be prepared as follows: 1 mol (59 grams) of an 85 per cent aqueous solution of hydrazine hydrate is refluxed on a water bath, and 102 grams of ethyl propionate is added in small portions, the solution being allowed to become clear before each successive addition. After 6 hours of further refluxing, the alcohol and water are removed by vacuum evaporation, and the residue is vacuum distilled. 70 grams of the hydrazide of propionic acid are obtained having a boiling point of 110–116° C. at 7–9 mm. and a melting point slightly above room temperature.

17.6 grams (0.2 mol) of the hydrazide of propionic acid, 16.8 grams (0.2 mol) of dicyandiamide, 17.3 cc. of concentrated hydrochloric acid, and 40 cc. of water are refluxed for 2 hours. 1 to 2 grams of a solid reaction product can be separated at this point. A similar amount of the reaction product can be separated after an additional 2 hours of refluxing, and a similar third portion of the reaction product can be separated after a third reflux period of 2 hours. This reaction product does not melt when heated to 250° C.

Various embodiments of the invention may be devised to meet various requirements.

Having described my invention, I claim:

1. A method of preparing dicyandiamide derivatives that comprises carrying out condensation, with elimination of a molecule of ammonia, of a molecule of dicyandiamide and a molecule of a hydrazide having not more than two hydrazide radicals, any atoms other than carbon, hydrogen and nitrogen in the molecule of such hydrazide consisting of oxygen atoms.

2. As a novel carbon compound, a product of the condensation, with elimination of a molecule of ammonia, of a molecule of dicyandiamide and a molecule of a hydrazide having not more than two hydrazide radicals, any atoms other than carbon, hydrogen and nitrogen in the molecule of such hydrazide consisting of oxygen atoms.

3. 1-guanyl guanazole.

JOHN KENSON SIMONS.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,211,709 | Zerweck | Apr. 13, 1940 |
| 2,216,077 | Zerweck | Oct. 15, 1940 |
| 2,295,567 | D'Alelio et al. | Sept. 15, 1942 |
| 2,332,302 | D'Alelio | Oct. 19, 1043 |
| 2,352,944 | D'Alelio | July 4, 1944 |

OTHER REFERENCES

Rupe, Berichte der deutschen Chemischen Gesellschaft, vol. 27, page 583 (1894).

Chem. Abstracts, 1908, page 3341 (citing: Gazz. Chim. ital., vol. 37 (2), pages 317–26).

Beilstein, "Handbuch der Organischen Chemie," Vierte Auflage, vol. XXVI, pages 195–196.

Chem. Abstracts, 1934, page 2714 (citing: J. prakt. Chemie, vol. 139, pages 193–210).